United States Patent [19]
Kutschenreuter, Jr.

[11] Patent Number: 5,349,815
[45] Date of Patent: Sep. 27, 1994

[54] SCRAMJET COMBUSTOR HAVING A TWO-PART, AFT-FACING STEP

[75] Inventor: Paul H. Kutschenreuter, Jr., Loveland, Ohio

[73] Assignee: General Electric Company, Cincinnati, Ohio

[21] Appl. No.: 750,343

[22] Filed: Aug. 27, 1991

[51] Int. Cl.⁵ .............................................. F02K 7/08
[52] U.S. Cl. ................................. 60/270.1; 60/749
[58] Field of Search .................. 60/270.1, 740, 742, 60/743, 39.06, 204, 749

[56] References Cited

U.S. PATENT DOCUMENTS

| | | | |
|---|---|---|---|
| 3,334,485 | 8/1967 | Rhodes et al. | 60/270.1 |
| 3,667,233 | 6/1972 | Curran et al. | 60/270 |
| 3,864,907 | 2/1975 | Curran | 60/261 |
| 4,903,480 | 2/1990 | Lee et al. | 60/270.1 |
| 5,081,831 | 1/1992 | Harshman | 60/270.1 |
| 5,085,048 | 2/1992 | Kutschenreuter et al. | 60/270.1 |
| 5,129,227 | 7/1992 | Klees et al. | 60/270.1 |

FOREIGN PATENT DOCUMENTS 2231093A  7/1990  United Kingdom .

OTHER PUBLICATIONS

"Supersonic Combustion Ramjet Research at Langley", by G. B. Northam and G. Y. Anderson, Short Course in Hypersonics–Aug. 19–22, 1986, State University of New York at Buffalo.

*Primary Examiner*—Richard A. Bertsch
*Assistant Examiner*—Michael I. Kocharov
*Attorney, Agent, or Firm*—Douglas E. Erickson; Jerome C. Squillaro

[57] ABSTRACT

A flight vehicle scramjet combustor. The combustor, in its "2-D" and annular embodiments, has two spaced-apart, generally opposing, and longitudinally extending walls. One wall includes a generally aft-facing step having a first section and an interconnected second section, a forward wall portion attached to the first section, and an aft wall portion attached to the second section. The second section includes a fuel injector discharge orifice having a fuel discharge axis which is aligned generally perpendicular to the second section and which projects both generally towards the other wall and longitudinally aft. The combustor has a cylindrical embodiment which includes a cylindrical wall having a step and fuel injector discharge orifice similar those of the "2-D" and annular combustor embodiments.

15 Claims, 3 Drawing Sheets

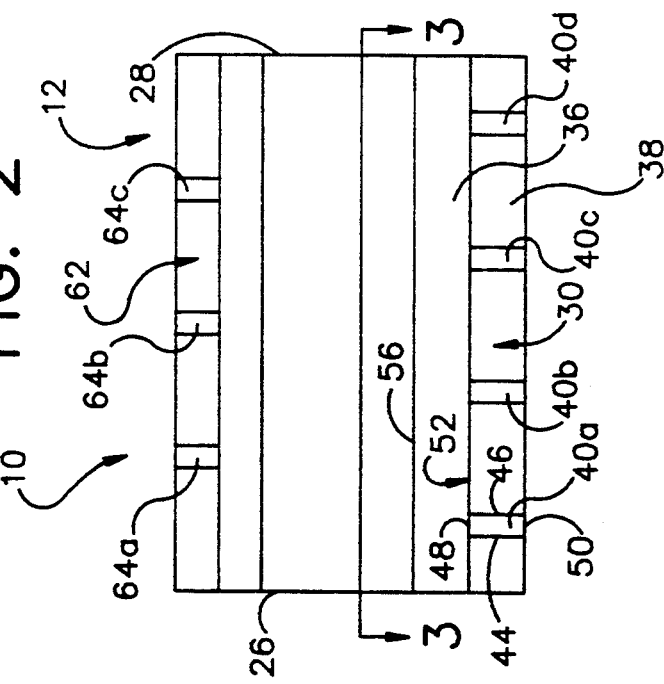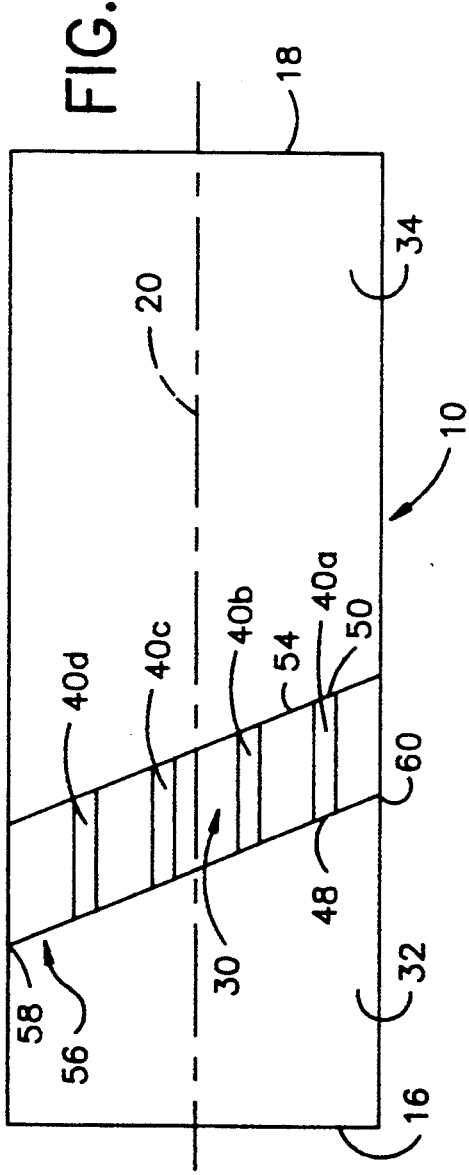

SCRAMJET COMBUSTOR HAVING A TWO-PART, AFT-FACING STEP

CROSS-REFERENCE TO RELATED APPLICATIONS

Reference is hereby made to the following copending U.S. Patent Application dealing with related subject matter and assigned to the assignee of the present invention: "Scramjet Including Integrated Inlet and Combustor" by Paul H. Kutschenreuter et al., assigned U.S. Ser. No. 07/486,640 and filed Feb. 28, 1990 (13DV-9936) now U.S. Pat. No. 5,085,048.

BACKGROUND OF THE INVENTION

The present invention relates generally to a scramjet combustor for a supersonic flight vehicle and more particularly to a scramjet combustor having a two-part, aft-facing step for improved combustor performance.

Although the theory of scramjet engines has been well known for many years, and although supersonic combustors have been tested in the laboratory, no scramjet engine has been reported to have flown successfully. Recent advances in technology, such as in high temperature materials, have made scramjet engines ready for implementation in the next generation of high speed aircraft. Such aircraft will be capable of flying at hypersonic speeds (i.e., speeds having Mach numbers greater than about 5.5).

Hypersonic flight vehicles have been proposed which incorporate scramjet engines to achieve high Mach numbers. Once such a vehicle has achieved a sufficient speed by some other propulsive means. (which may include a turbojet engine), a scramjet engine will take over to propel the aircraft to high Mach numbers (typically between Mach 6 and Mach 20). Such high Mach numbers cannot be achieved by any other known type of air-breathing engine.

A typical scramjet engine includes a combustor having a chamber, wherein a fuel-air mixture moving at supersonic speed is burned, and having at least one fuel injector which directs supersonically-moving fuel (such as pressurized hydrogen) into the chamber. The engine also includes an air inlet, which delivers compressed supersonically-moving air to the combustor chamber, and further includes an exhaust nozzle, which channels the burning gases out of the combustor chamber to help produce engine thrust. The fuel injector discharge orifices are the openings in the combustor chamber to which fuel is delivered by a fuel system which may include tanks, pumps, and conduits. In the case of hydrogen fuel, the fuel-air mixture in the combustor chamber will have a high enough temperature and pressure to auto-ignite.

Known scramjet combustor designs include combustor walls having an aft-facing step and include an angled fuel injector located at the top of the step or a transversely-directed fuel injector located at the bottom of the step. In all cases, known fuel injectors appear to be round conduits. "Angled" fuel injection means the injected fuel is not parallel or perpendicular (transverse) to the generally longitudinally-moving air. It is known in the art that as the flight Mach number increases above about Mach 10–12, a substantial and increasing portion of the engine thrust comes from the discharge of the pressurized fuel from the angled fuel injectors and not from the burning of that fuel. It is also known that angled or transverse fuel injection promotes significantly better fuel penetration into the airstream and better fuel-air mixing than can be achieved from axial injection. Consequently, to achieve adequate fuel penetration across the height of the combustion chamber with axial injection, it is common practice to utilize some type of fuel injector which protrudes into the airstream. Such practice produces large thrust losses and requires increased fuel cooling requirements. It is further known that an aft-facing step stabilizes combustion by providing a "shield" which keeps combustion-induced pressure rises from propagating upstream, which can otherwise occur due to varying inlet conditions and perturbations in fuel flow and which can lead to engine shutdown (also called inlet "unstart"). What is needed is a scramjet combustor having an improved design which better integrates the requirements for angled fuel injector discharge thrust, fuel-air mixing, and burning stability without requiring increased fuel cooling.

SUMMARY OF THE INVENTION

It is an object of the invention to provide a scramjet combustor which has improved burning stability and fuel-air mixing and which has angled fuel injector discharge thrust without requiring increased fuel cooling.

The invention provides a flight vehicle scramjet combustor having two spaced-apart, generally opposing, and generally longitudinally extending walls extending forward and aft. One of the walls includes a generally aft-facing step, a forward wall portion extending generally longitudinally forward of the step, and an aft wall portion extending generally longitudinally aft of said step. The step includes a first section and an interconnected second section. The first section is attached to the forward wall portion, and the second section is attached to the aft-wall portion. The second section includes a fuel injector discharge orifice having a fuel discharge axis. The fuel discharge axis is aligned generally perpendicular to the second section, projects generally towards the other wall, and projects generally longitudinally aft. Preferably, the fuel discharge orifice has a generally rectangular shape with its two shorter sides generally aligned with the intersection of the first and second sections. Where the one wall is generally planar, preferably the intersection of the forward wall portion and the first section is a generally straight line having one end positioned longitudinally forward of its other end.

In another embodiment, the scramjet combustor of the invention has a longitudinal axis and a generally coaxially disposed cylindrical wall extending generally longitudinally forward and aft. The wall includes a generally aft-facing step, a forward wall portion extending generally longitudinally forward of the step, and an aft wall portion extending generally longitudinally aft of said step. The step includes a first section and an interconnected second section. The first section is attached to the forward wall portion, and the second section is attached to the aft-wall portion. The second section includes a fuel injector discharge orifice having a fuel discharge axis. The fuel discharge axis is aligned generally perpendicular to the second section, projects generally towards the longitudinal axis, and projects generally longitudinally aft. Preferably, the fuel discharge orifice has a generally rectangular shape with its two shorter sides generally aligned with the intersection of the first and second sections.

Several benefits and advantages are derived from the invention. The two-part step achieves better burning stability by allowing for (angled) fuel injection at the second section below the first section and therefore below the top of the step. The first section of the step acts as a shield behind which the fuel is injected to minimize the possibility of the injected fuel from propagating upstream, which can otherwise occur due to varying inlet conditions and perturbations in fuel flow and which can lead to engine shutdown. Additionally, fuel injection below the top of the step allows for the fuel to penetrate some into the combustion chamber, spreading laterally (sideways) and vertically (towards the top of the step) before encountering the longitudinally moving airflow which tends to "bend over" the fuel. As some combustion takes place behind and below the top of the step, such shielded penetration and (especially lateral) spreading means the fuel injector discharge orifices may be more laterally spaced apart, resulting in fewer but larger such orifices. A larger such orifice means greater fuel penetration before the fuel becomes overpowered by the longitudinally moving supersonic airflow. The generally rectangular fuel injector discharge orifice further promotes mixing by reducing the orifice frontal area, thereby offering less resistance to the airflow. This enhances fuel penetration. Also, the rectangular shape increases the orifice side area providing more fuel surface area to be "scrubbed" by the airflow. This enhances fuel-air mixing. Where the one combustor wall is planar, the sweeping of the step (having the intersection of the forward wall portion and the first section be a straight line with one end longitudinally forward of the other end) allows the step to match the swept design of many hypersonic flight vehicle inlets and engine cowls to create uniform airflow conditions laterally across the step allowing for a uniform fuel supply to the fuel injector discharge orifices in the step.

BRIEF DESCRIPTION OF THE DRAWINGS

The accompanying drawings illustrate two preferred embodiments of the present invention wherein:

FIG. 1 is a schematic cross-sectional side view of a "2-D" type of scramjet combustor embodiment of the invention showing the two-part step;

FIG. 2 is a schematic cross-sectional end view of the combustor of FIG. 1 taken along lines 2—2 of FIG. 1 showing the generally rectangular fuel injector discharge orifices;

FIG. 3 is a schematic cross-sectional top view of the combustor of FIG. 1 taken along lines 3—3 of FIG. 2;

DETAILED DESCRIPTION OF THE INVENTION

Figure 5:
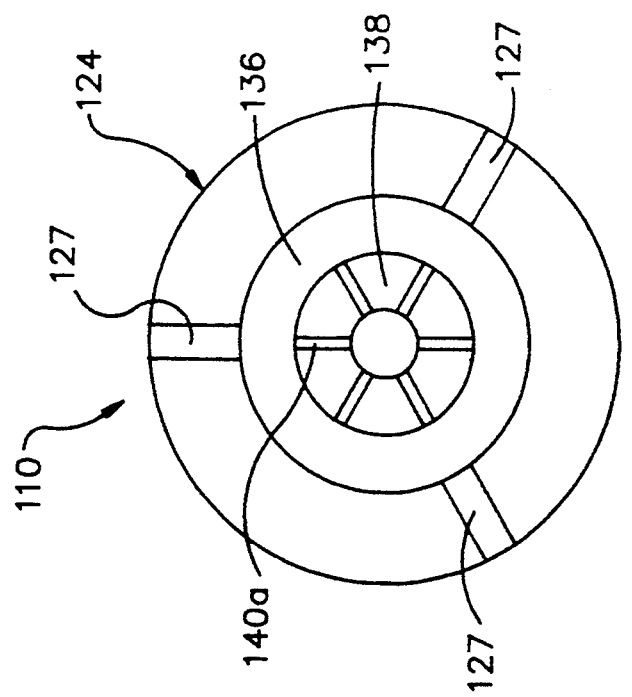
FIG. 5 is a schematic cross-sectional end view of the combustor of FIG. 4 taken along lines 5—5 of FIG. 4 showing the generally rectangular fuel injector discharge orifices.

A preferred flight vehicle scramjet combustor 10 (sometimes referred to as a "2-D" combustor) is shown in cross section in FIGS. 1, 2, and 3, and includes a rectangular duct housing 12 forming a combustion chamber 14 and having a forward air-inlet orifice 16 communicating with the engine inlet (not shown) and an aft air-outlet orifice 18 communicating with the engine exhaust nozzle (also not shown). The combustor's longitudinal axis 20 is defined by a line joining each orifice's center point (the orifice's "center of area"). The housing 12 includes two spaced-apart, generally opposing, and generally longitudinally extending walls 22 and 24, extending forward and aft. The walls 22 and 24 are connected together by two narrower walls 26 and 28 to form the generally rectangular duct-shaped combustion chamber 14. One of the walls 22 includes a generally aft-facing step 30, a forward wall portion 32 extending generally longitudinally forward of the step 30, and an aft wall portion 34 extending generally longitudinally aft of the step 30. The step 30 includes a first section 36 and an interconnected second section 38 with the first section 36 attached to the forward wall portion 32 and the second section 38 attached to the aft wall portion 34. The step 30 is a two-part step which is defined as a step having two interconnected sections 36 and 38 having different slopes. As one moves longitudinally aft along a wall of a combustor having a two-part step, one encounters the step's first section 36 which has a generally constant slope, and then one encounters the step's second section 38 which has a different generally constant slope. Preferably, the first section 36 of the step 30 is generally perpendicular to the forward wall portion 32 of the one wall 22. The second section 38 includes a fuel injector discharge orifice 40a having a fuel discharge axis 42 which is aligned generally perpendicular to the second section 38 and which projects both generally towards the other wall 24 and longitudinally aft. It is noted that the one wall 22 has a generally planar shape longitudinally forward of the step 30 and a generally planar shape longitudinally aft of the step 30.

As seen in FIG. 2, the fuel injector discharge orifice 40a, in an exemplary design, has a generally rectangular shape with two longer sides 44 and 46 and two shorter sides 48 and 50. The first and second sections 36 and 38 of the step 30 intersect along an intersection 52, and the two shorter sides 48 and 50 of the fuel injector discharge orifice 40a are each generally aligned with the intersection 52. Preferably, the longer sides 44 and 46 of the fuel injector discharge orifice 40a extend generally between the intersection 52 of the first and section sections 36 and 38 of the step 30 and the intersection 54 of the second section 38 and the aft wall portion 34.

The second section 38 of the step 30 also includes additional fuel injector discharge orifices 40b, 40c, and 40d which are laterally spaced apart from themselves and from the fuel injector discharge orifice 40a. Preferably the fuel injector discharge orifice 40a and the additional fuel injector discharge orifices 40b, 40c, and 40d are generally aligned in a generally laterally extending row.

As seen in FIG. 3, the forward wall portion 32 and the first section 36 of the step 30 intersect along a generally straight line 56 having a first end 58 and a second end 60, and in an exemplary "swept-combustor" design the first end 58 is disposed longitudinally forward of the second end 60. The generally rectangular fuel injector discharge orifice 40a is seen in FIG. 3 to have slanted or "swept" shorter sides 48 and 50. It is noted that "generally rectangular" also includes fuel injector discharge orifices whose shorter sides are curved (as might be desired to minimize stress points).

A particular flight vehicle scramjet combustor design may include the other wall 24 having a generally aft-facing step 62 which is identical to the step 30 in the one wall 22. Such step 30 of the one wall 22 may be disposed longitudinally forward of the step 62 of the other wall 24 (as seen in FIG. 1), or it may be longitudinally aligned with it. The step 62 of the other wall 24 is seen to have a fuel injector discharge orifice 64a with a fuel discharge axis 66 and additional fuel injector discharge orifices 64b and 64c. As seen in FIG. 2, the fuel injector discharge orifice 64a and additional orifices 64b and 64c of the other wall 24 are laterally offset from (although they could be laterally aligned with) the fuel injector discharge orifice 40a and additional orifices 40b, 40c, and 40d of the one wall 22. In other applications, the narrower walls 26 and 28 may also have such steps.

In operation, supersonically-moving air enters the forward air-inlet orifice 16 of the flight vehicle scramjet combustor 10 and moves generally parallel to the combustor's longitudinal axis 20. The swept step 30 matches the sweep of the hypersonic flight vehicle inlet and engine cowl (not shown) to create uniform airflow conditions laterally across the step 30 allowing for a uniform fuel supply to the step's fuel injector discharge orifices 40. Fuel is injected at an angle along the fuel discharge axis 42 to provide for fuel injector discharge thrust. The fuel is injected below the top 56 of the step 30 with the first section 36 of the step 30 acting as a shield for the fuel against the airflow to minimize the possibility of engine shutdown due to injected fuel propagating upstream. The shielding effect also allows the injected fuel to spread before encountering the airflow, allowing for fewer but larger fuel injector discharge orifices 40. A larger orifice 40 means greater fuel penetration. The rectangular orifices 40 have their shorter sides 48 and 50 aligned to present a reduced orifice frontal area to the airflow for enhanced fuel penetration and to present an increased orifice side area to the airflow for enhanced fuel-air mixing. It is noted that there is no protrusion of the fuel injector into the airstream which would increase fuel cooling requirements.

Figure 4:
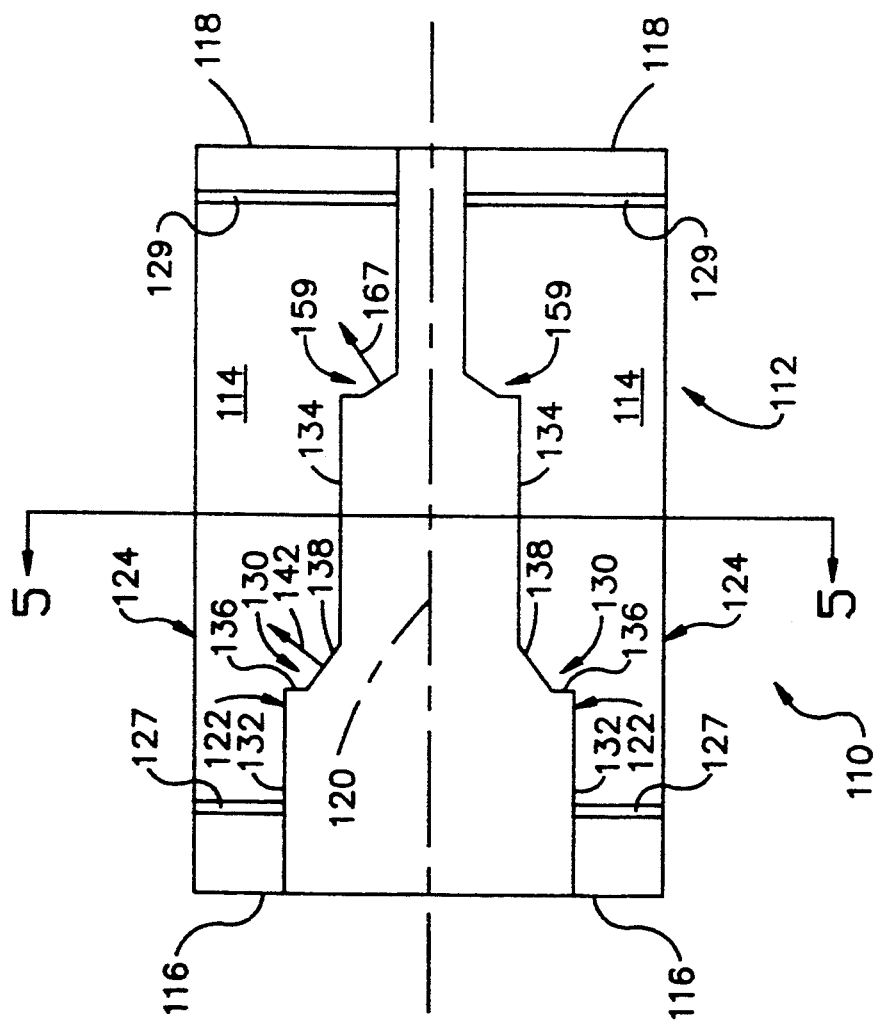
FIG. 4 is a schematic cross-sectional side view of an "annular" type of scramjet combustor embodiment of the invention showing the two-part step.

Another preferred flight vehicle scramjet combustor 110 (sometimes referred to as an annular combustor) is shown in cross section in FIGS. 4 and 5, and includes an annular duct housing 112 forming a combustion chamber 114 and having a forward air-inlet orifice 116 communicating with the engine inlet (not shown) and an aft air-outlet orifice 118 communicating with the engine exhaust nozzle (also not shown). The combustor's longitudinal axis 120 is defined by a line joining each orifice's center point (the orifice's "center of area"). The housing 112 includes two spaced-apart, generally opposing, and generally longitudinally extending walls 122 and 124, extending forward and aft, which are connected together, such as by forward and aft strut members 127 and 129 to form the generally annular duct-shaped combustion chamber 114. One of the walls 122 includes a generally aft-facing step 130, a forward wall portion 132 extending generally longitudinally forward of the step 130, and an aft wall portion 134 extending generally longitudinally aft of the step 130. The step 130 includes a first section 136 and an interconnected second section 138 with the first section 136 attached to the forward wall portion 132 and the second section 138 attached to the aft wall portion 134. Preferably, the first section 136 of the step 130 is generally perpendicular to the forward wall portion 132 of the one wall 122. The second section 138 includes a fuel injector discharge orifice 140a having a fuel discharge axis 142 which is aligned generally perpendicular to the second section 138 and which projects both generally towards the other wall 124 and longitudinally aft. It is noted that the one wall 122 has a generally annular shape longitudinally forward of the step 130 and a generally annular shape longitudinally aft of the step 130.

Although not shown in the figures, the annular scramjet combustor 110 may circumferentially surround the flight vehicle or it may be attached to the flight vehicle with consideration given to integrating the scramjet engine into the flight vehicle, as is known to those skilled in the art.

A particular flight vehicle scramjet combustor design may include the one wall 122 having a second generally aft-facing step 159 which is identical to the first step 130 in the one wall 122. The second step 159 is disposed longitudinally aft of the first step 130 (as seen in FIG. 4), and such second step 159 has a fuel injector discharge orifice with a fuel discharge axis 167.

The operation of the annular scramjet combustor 110 is the same as that of the "2-D" scramjet combustor 10 but without the step 130 being swept. The annular combustor 110 may still have uniform airflow conditions laterally (circumferentially) across its "unswept" step 130 if the airflow has not encountered swept surfaces upstream of the step 130, such as in the case of an annular combustor circumferentially surrounding the flight vehicle (not shown).

Figure 7:
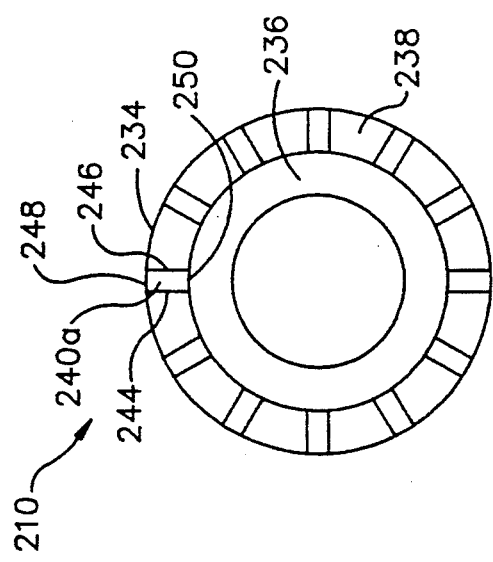
FIG. 7 is a schematic cross-sectional end view of the combustor of FIG. 4 taken along lines 7—7 of FIG. 6 showing the generally rectangular fuel injector discharge orifices.
Figure 6:
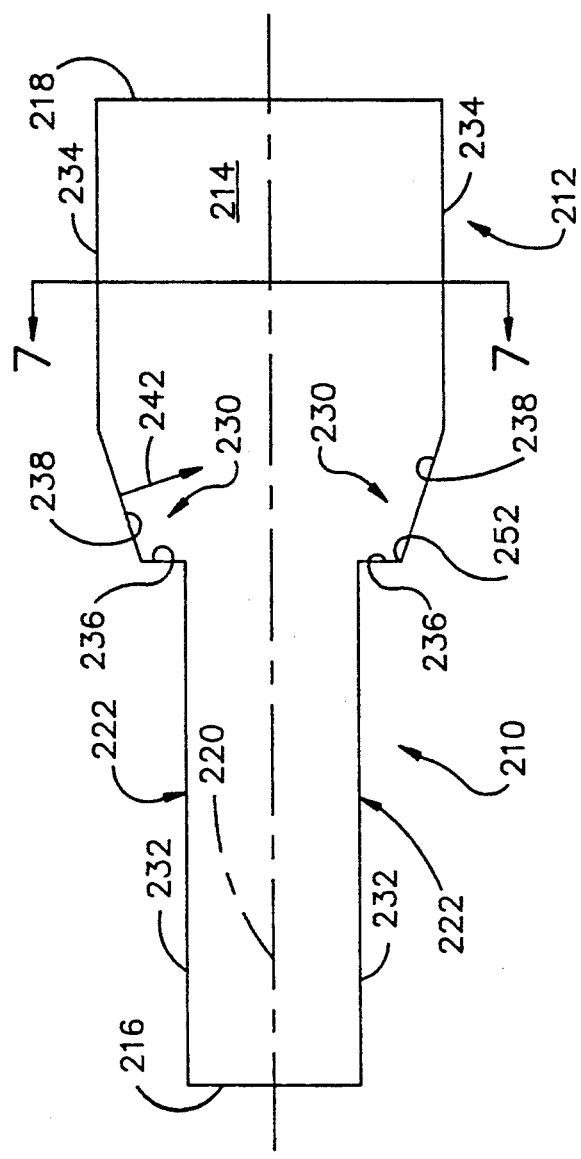
FIG. 6 is a schematic cross-sectional side view of a "cylindrical" type of scramjet combustor embodiment of the invention showing the two-part step.

A further preferred flight vehicle scramjet combustor 210 (sometimes referred to as a cylindrical combustor) is shown in cross section in FIGS. 6 and 7, and includes a cylindrical duct housing 212 forming a combustion chamber 214 and having a forward air-inlet orifice 216 communicating with the engine inlet (not shown) and an aft air-outlet orifice 218 communicating with the engine exhaust nozzle (also not shown). The combustor includes a longitudinal axis 220. The housing 212 includes a generally coaxially disposed cylindrical wall 222 extending generally longitudinally forward and aft to form the generally cylindrical duct-shaped combustion chamber 214. The cylindrical wall 222 includes a generally aft-facing step 230, a forward wall portion 232 extending generally longitudinally forward of the step 230, and an aft wall portion 234 extending generally longitudinally aft of the step 230. The step 230 includes a first section 236 and an interconnected second section 238 with the first section 236 attached to the forward wall portion 232 and the second section 238 attached to the aft wall portion 234. Preferably, the first section 236 of the step 230 is generally perpendicular to the forward wall portion 232 of the cylindrical wall 222. The second section 238 includes a fuel injector discharge orifice 240a having a fuel discharge axis 242 which is aligned generally perpendicular to the second section 238 and which projects both generally towards the longitudinal axis 220 and longitudinally aft. It is noted that the cylindrical wall 222 has a generally annular shape longitudinally forward of the step 230 and a generally annular shape longitudinally aft of the step 230. Also, the fuel injector discharge orifice 240a has a generally rectangular shape with two longer sides 244 and 246 and two shorter sides 248 and 250. The first and second sections 236 and 238 of the step 230 intersect along a generally circular intersection 252, and the two shorter sides 248 and 250 of the fuel injector discharge orifice 240a are each generally aligned with the circular intersection 252. The operation of the cylindrical scramjet combustor 210 is the same as that of the annular scramjet combustor 110.

The foregoing description of three preferred embodiments of the invention has been presented for purposes of illustration. It is not intended to be exhaustive or to limit the invention to the precise "2-D", annular, and/or cylindrical designs disclosed, and obviously many modifications and variations are possible in light of the above teaching.

I claim:

1. A flight vehicle scramjet combustor comprising: two spaced-apart, generally opposing, and generally longitudinally extending walls extending forward and aft, wherein one of said walls includes a generally aft-facing step, a forward wall portion extending generally longitudinally forward of said step, and an aft wall portion extending generally longitudinally aft of said step, wherein said step includes a first section and an interconnected second section, wherein said first section is attached to said forward wall portion and said second section is attached to said aft wall portion, and wherein said first section is generally perpendicular to said forward wall portion and said second section includes a fuel injector discharge orifice and faces both generally towards the other of said walls and longitudinally aft.

2. The combustor of claim 1, wherein said one wall has a generally annular shape longitudinally forward of said step and a generally annular shape longitudinally aft of said step.

3. The combustor of claim 1, wherein said one wall has a generally planar shape longitudinally forward of said step and a generally planar shape longitudinally aft of said step.

4. The combustor of claim 1, wherein said fuel injector discharge orifice has a generally rectangular shape with two longer sides and two shorter sides, wherein said first and second sections intersect along an intersection, and wherein said two shorter sides are each generally parallel to said intersection.

5. The combustor of claim 4, wherein said one wall has a generally planar shape longitudinally forward of said step and a generally planar shape longitudinally aft of said step.

6. The combustor of claim 5, wherein said forward wall portion and said first section intersect along a generally straight line having a first end and a second end and wherein said first end is disposed longitudinally forward of said second end.

7. The combustor of claim 6, wherein said second section also includes additional said fuel injector discharge orifices spaced apart from themselves and from said fuel injector discharge orifice.

8. The combustor of claim 7, wherein said fuel injector discharge orifice and said additional said fuel injector discharge orifices are generally aligned in a row.

9. The combustor of claim 8, wherein said other wall includes a step having spaced apart fuel injector discharge orifices which are not aligned with any of those of said one wall.

10. The combustor of claim 1, wherein said one wall includes a second step disposed longitudinally aft of said step.

11. The combustor of claim 1, wherein said other wall includes a step.

12. The combustor of claim 11, wherein said step of said one wall is disposed longitudinally forward of said step of said other wall.

13. A flight vehicle scramjet combustor comprising: a longitudinal axis and a generally coaxially disposed cylindrical wall extending generally longitudinally forward and aft, said wall including a generally aft-facing step, a forward wall portion extending generally longitudinally forward of said step, and an aft wall portion extending generally longitudinally aft of said step, wherein said step includes a first section and an interconnected second section, wherein said first section is attached to said forward wall portion and said second section is attached to said aft wall portion, and wherein said first section is generally perpendicular to said forward wall portion and said second section includes a fuel injector discharge orifice and faces both generally towards said longitudinal axis and longitudinally aft.

14. The combustor of claim 13, wherein said wall has a generally annular shape longitudinally forward of said step and a generally annular shape longitudinally aft of said step.

15. The combustor of claim 13 wherein said fuel injector discharge orifice has a generally rectangular shape with two longer sides and two shorter sides, wherein said first and second sections intersect along an intersection, and wherein said two shorter sides are each generally parallel to said intersection.

* * * * *